Patented July 24, 1923.

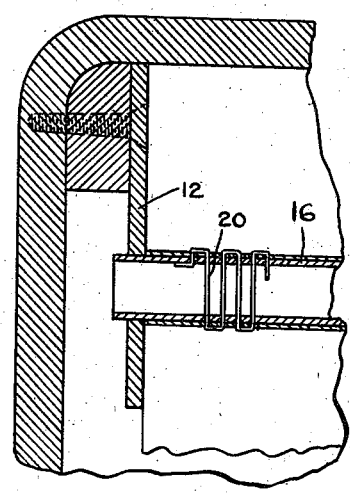
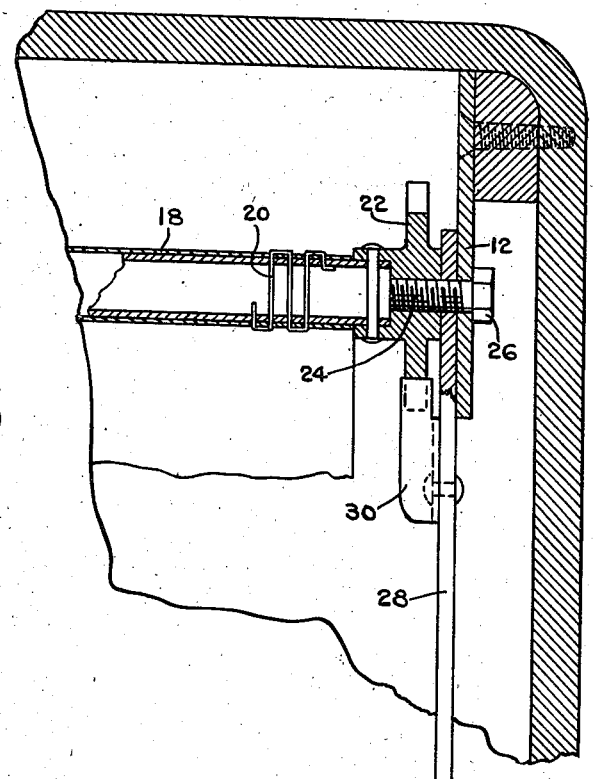
FIG.-3.
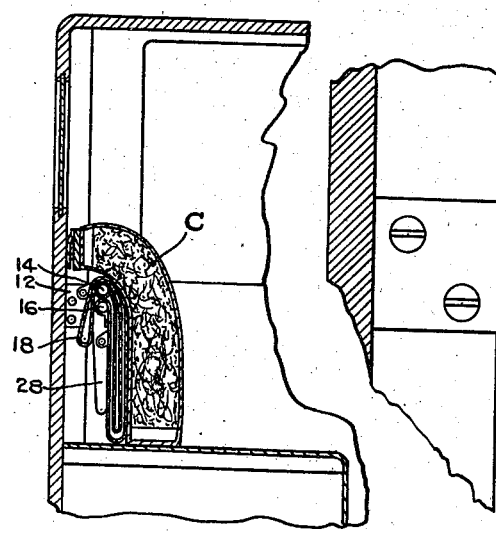
FIG.-4.
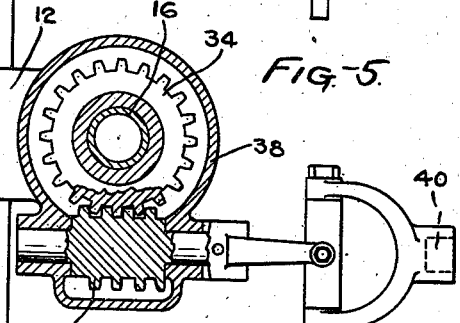
FIG.-5.
INVENTOR:
A. STOCKLAND.
BY Whiteley and Ruckman
ATTORNEYS.

1,462,667

UNITED STATES PATENT OFFICE.

ARTHUR STOCKLAND, OF MINNEAPOLIS, MINNESOTA, ASSIGNOR TO CHARLES K. STOCKLAND, OF MINNEAPOLIS, MINNESOTA.

AUTOMOBILE BED.

Application filed August 25, 1922. Serial No. 584,244.

*To all whom it may concern:*

Be it known that I, ARTHUR STOCKLAND, a citizen of the United States, residing at Minneapolis, in the county of Hennepin and State of Minnesota, have invented certain new and useful Improvements in Automobile Beds, of which the following is a specification.

My invention relates to automobile beds, and an object is to provide a construction by means of which a strip of flexible material, such as canvas, may be tightly stretched longitudinally within the car extending between the front and rear thereto to constitute a bed whereby the necessity is avoided of providing an additional canopy or tent to cover the bed. Another object is to provide a device of this kind which occupies very little space and can be readily stowed in the car.

The full objects and advantages of my invention will appear in connection with the detailed description, and the novel features embodied in my inventive idea will be particularly pointed out in the claim.

Figure 1:
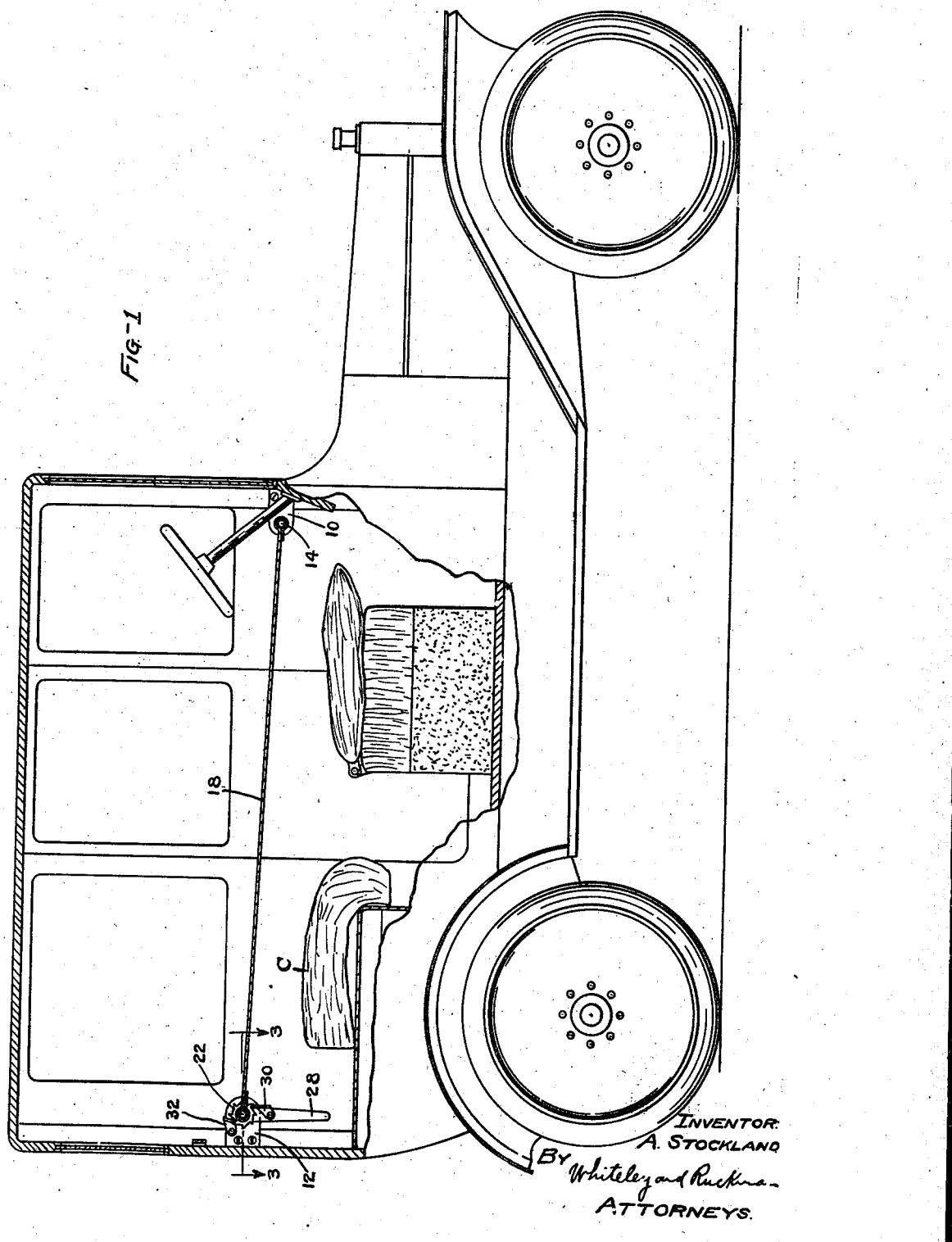
Figure 2:
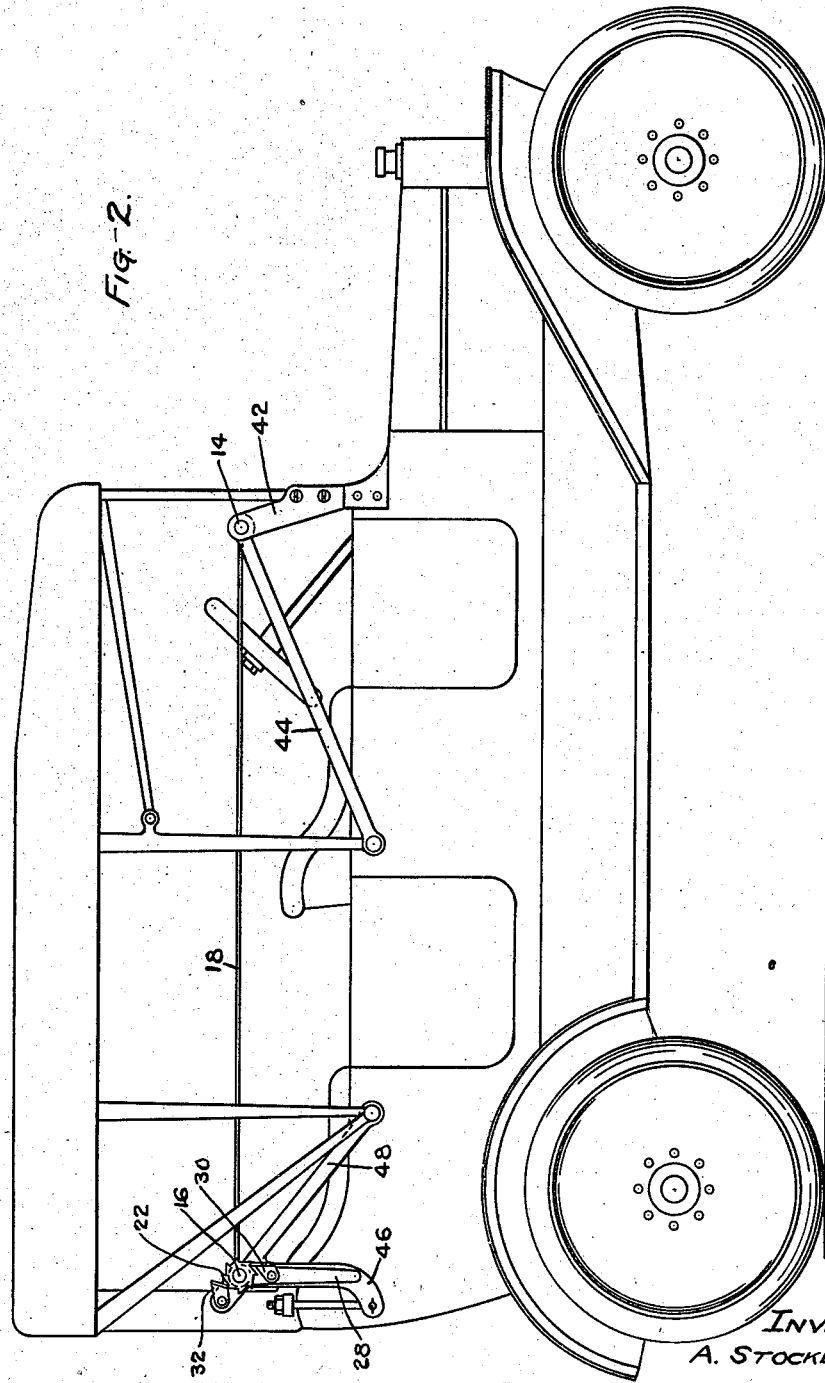

In the accompanying drawings which illustrate the application of my invention to both closed and open types of automobiles—Fig. 1 is a view partly in side elevation and partly in section showing my device applied to a closed automobile. Fig. 2 is a view in side elevation showing a modified form of the device applied to a touring or open car. Fig. 3 is an enlarged view in horizontal section on the line 3—3 of Fig. 1. Fig. 4 is a fragmentary view in vertical section through the rear seat showing the device stowed away. Fig. 5 is a sectional view of a modified form of winding device.

Referring first more particularly to the construction shown in Figs. 1, 3 and 4, the numeral 10 designates one of a pair of brackets on opposite sides of the car at the front thereof, and the numeral 12 designates a pair of brackets on opposite sides of the car at the rear thereof. A rod 14 is adapted to extend through holes in the pair of front brackets 10, and a rod 16 is adapted to extend through a hole in one of the pair of rear brackets 12. A strip of flexible material 18 such as canvas is provided at one end with a loop through which the front rod 14 extends and at its other end is provided with a loop through which the rear rod 16 extends, this latter loop being secured to the rod by wires 20 which prevent the rod from turning inside the loop whereby the canvas may be stretched by rotating the rod 16. As shown in Fig. 3, the rod 16 at one end extends through a hole in one of the brackets 12 and to its other end is secured a ratchet wheel 22. A bolt 24 is threaded into the axis of the ratchet wheel and this bolt extends through one of the brackets 12 and is provided with a nut 26 which prevents the rod 16 from endwise movement. A handle lever 28 is rotatably mounted on the bolt 24 between the ratchet wheel 22 and the bracket 12 while a pawl 30 pivotally attached to the lever 28 is adapted to engage the teeth of the ratchet wheel 22 for rotating the rod 16. A detent 32 prevents backward turning of the rod. Fig. 5 shows a modified form of turning device in which a worm wheel 34 is secured to the rod 16 in place of the ratchet wheel 22. A worm 36 engages the teeth of the worm wheel 34, this worm being mounted in bearings in a gear case 38. One end of the axis of the worm 36 has an extension provided with a square socket 40 for engagement by a socket wrench. When the device is to be used as a bed, it is positioned as shown in Fig. 1 and upon rotating the rod 36 in the manner described the canvas will be stretched tightly. When the device is thus used, the front seat is turned down as shown and the back cushion C of the rear seat is dropped down. When the device is not in use as a bed, it may be stowed behind the back cushion C as shown in Fig. 4 where it will be out of the way when the car is being driven. Fig. 2 shows a modification of the device for use in connection with touring cars. As shown in this figure, the car is provided with front brackets 42 to which braces 44 are attached. The rod 14 is passed through holes in the pair of brackets 42. The car is provided with rear brackets 46 to which braces 48 are attached. The rod 16 at one end extends through a hole in one of the brackets 46 and at its other end is provided with a ratchet wheel 22 and hand lever 28 in the manner previously described and best shown in Fig. 3. A pawl 30 is pivoted to the lever 28 and a detent 32 is provided to prevent backward rotation of the rod 16.

The operation and advantages of my device will now be obvious. The canvas 18 may be quickly extended between the front and rear of the car and will be tightly stretched for use as a bed upon rotating the rod 16. Due to the fact that the bed when in use is entirely within the car and underneath the canopy thereof, there is no necessity for providing a tent to cover the bed when in use.

I claim:

In combination with an automobile, a pair of brackets secured on opposite sides of the automobile at the front thereof, a strip of flexible material, a rod to which one end of said strip is attached, said rod being adapted to extend through holes in said brackets, a pair of brackets secured on opposite sides of the automobile at the rear thereof, a second rod to which the other end of said strip is secured for rotation therewith, said second rod being rotatably mounted in said second pair of brackets, and means whereby said second rod may be rotated to stretch said strip, said second pair of brackets being secured behind the position normally occupied by the back cushion of the rear seat whereby the device when not in use may be stowed behind said cushion.

In testimony whereof I hereunto affix my signature.

ARTHUR STOCKLAND.